United States Patent
Burkhardt et al.

(10) Patent No.: US 6,690,339 B2
(45) Date of Patent: Feb. 10, 2004

(54) METHOD AND CIRCUIT ARRANGEMENT FOR CONTROLLING THE OPERATING POINT OF A CATHODE RAY TUBE

(75) Inventors: Klaus Burkhardt, Kraichtal (DE); Uwe Nagel, Karlsruhe (DE); Erich Schaefer, Karlsruhe (DE); Hartmut Schulz, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 332 days.

(21) Appl. No.: 09/875,093

(22) Filed: Jun. 7, 2001

(65) Prior Publication Data

US 2002/0000952 A1 Jan. 3, 2002

Related U.S. Application Data

(63) Continuation of application No. PCT/DE99/03912, filed on Dec. 7, 1999.

(30) Foreign Application Priority Data

Dec. 7, 1998 (DE) .......................................... 198 56 384

(51) Int. Cl.[7] ................................................ G09G 1/06
(52) U.S. Cl. ............................. 345/10; 345/11; 345/12; 315/1; 348/805; 313/364
(58) Field of Search ........................ 345/10–12, 13–18; 313/364, 446; 315/1, 30; 348/805

(56) References Cited

U.S. PATENT DOCUMENTS

| | | | | |
|---|---|---|---|---|
| 4,283,723 A | * | 8/1981 | Bickley et al. | 340/722 |
| 4,287,450 A | * | 9/1981 | Kawakami et al. | 315/14 |
| 4,336,597 A | * | 6/1982 | Okubo et al. | 364/560 |
| 4,680,599 A | * | 7/1987 | Wertz et al. | 340/744 |
| 4,882,577 A | * | 11/1989 | DeVore | 340/739 |
| 5,010,275 A | * | 4/1991 | van der Wilk | 315/106 |
| 5,115,229 A | * | 5/1992 | Shalit | 340/716 |
| 5,241,281 A | * | 8/1993 | Wilkes et al. | |
| 5,257,096 A | | 10/1993 | Oshima | 358/10 |
| 5,410,245 A | * | 4/1995 | Ikuzawa et al. | 348/194 |
| 5,565,897 A | * | 10/1996 | Kikinis et al. | 345/213 |
| 5,977,711 A | * | 11/1999 | Van Du et al. | 315/30 |
| 2002/0033780 A1 | * | 3/2002 | Kimoto et al. | 345/10 |

FOREIGN PATENT DOCUMENTS

| | | | |
|---|---|---|---|
| DE | 35 35 570 | 4/1987 | H04N/5/18 |
| DE | 36 10 190 C2 | 10/1987 | G09G/1/04 |
| DE | 692 20 001 T2 | 5/1993 | H04N/9/72 |
| DE | 197 46 426 A1 | 4/1999 | G09G/5/10 |
| EP | 0 840 272 A2 | 5/1998 | G09G/1/00 |
| WO | 97/04601 | 2/1997 | H04N/9/73 |

* cited by examiner

*Primary Examiner*—Richard Hjerpe
*Assistant Examiner*—Kimnhung Nguyen
(74) *Attorney, Agent, or Firm*—Sughrue Mion, PLLC

(57) ABSTRACT

A method and a circuit arrangement for controlling the operating point of a cathode ray tube (3) for use in image technology applications. A video signal (1) is supplied to both the tube (3) and to a cathode ray tube model (2), which the model (2) uses to emulate a beam current. From the emulated beam current and a measured beam current, a characteristic quantity for adjusting the operating point is determined.

9 Claims, 1 Drawing Sheet

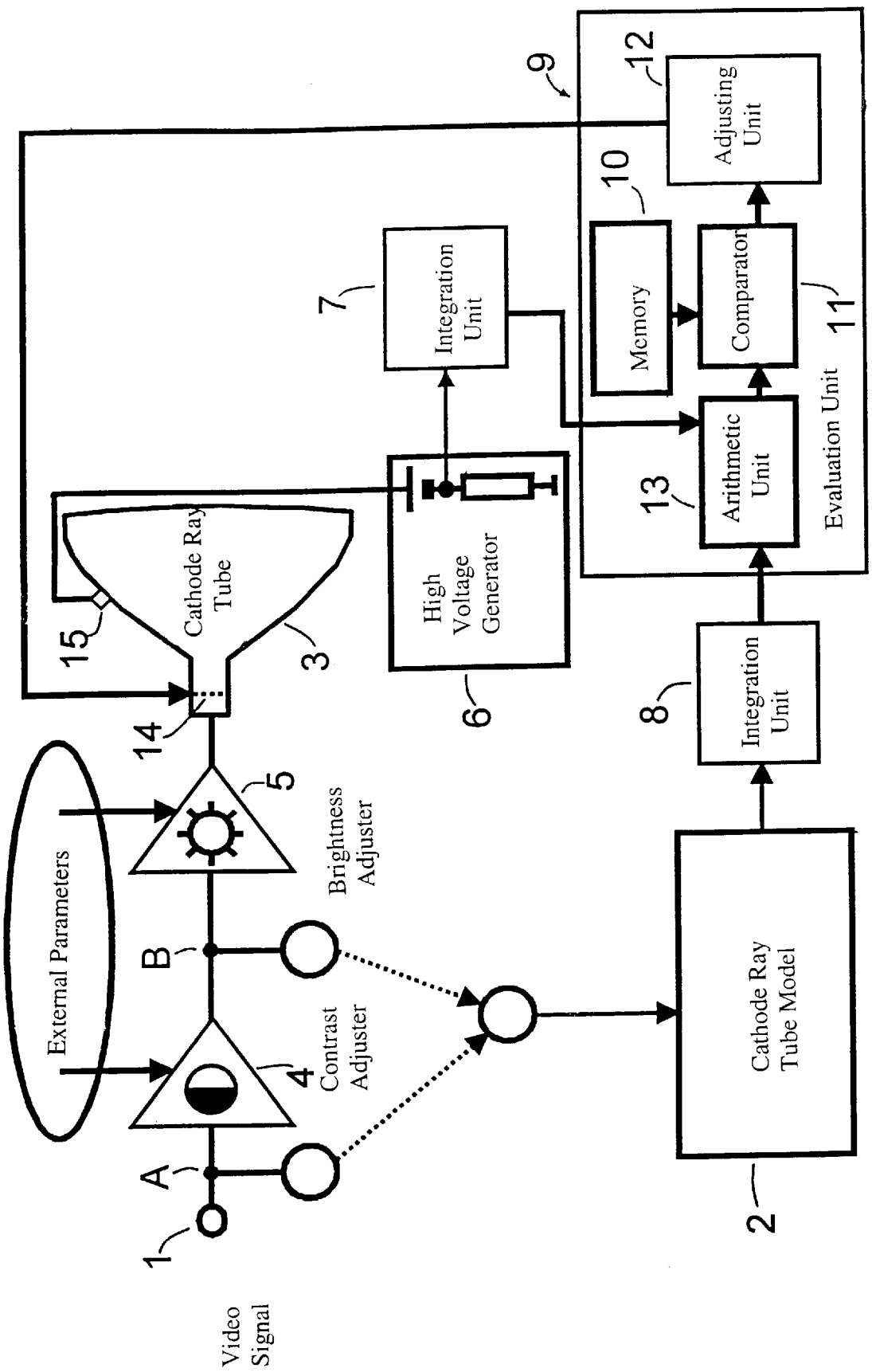

METHOD AND CIRCUIT ARRANGEMENT
FOR CONTROLLING THE OPERATING
POINT OF A CATHODE RAY TUBE

This is a Continuation of International Application PCT/DE99/03912 with an international filing date of Dec. 7, 1999, which was published under Article 21(2) in German, and the complete disclosure of which is incorporated into this application by reference.

FIELD OF AND BACKGROUND OF THE INVENTION

The invention relates to a method for controlling the operating point of a cathode ray tube, to which a video signal is supplied and which further has a control grid that applies a control voltage to an adjustment unit for adjusting the operating point. The invention further relates to a circuit arrangement for implementing this method.

German Patent DE 36 10 190 discloses a method for controlling the operating point of the video output stages of a monitor. To this end, a beam current is measured during selected lines that are not required for the display of information on a screen and is used to control the operating point. A voltage that is proportional to the beam current is measured at a resistor, which is connected to ground as well as to a cathode via a transistor. A video amplifier evaluates the voltage to control the operating point.

German Application 197 46 426.2 proposes means for controlling the operating point, which measure brightness values in at least a portion of an invisible area while a test signal is being injected. Said controlling means converts the measured brightness values into a controlled quantity, which can be supplied to a control unit to control the operating point.

OBJECTS OF THE INVENTION

An object of the present invention is to improve the operating point control in a method and circuit arrangement of the type mentioned above.

SUMMARY OF THE INVENTION

This and other objects of the invention are achieved, with respect to a method of the invention, by controlling the operating point of a cathode ray tube, to which a video signal is supplied and which includes a control grid that applies a control voltage from an adjusting unit for adjusting the operating point. Specifically, during a calibration phase using a test image for a set operating point with different brightness and/or contrast values the method includes supplying a test video signal to a cathode ray tube model and to a cathode ray tube; determining an emulated beam current from the video signal using the cathode ray tube model; measuring a beam current of the cathode ray tube, which is proportional to the video signal; calculating first characteristic quantities from the measured beam current and the emulated beam current; and storing said first characteristic quantities calculated from the measured and emulated beam currents in a memory location.

During normal operation, when the cathode ray tube is controlled with picture signals the method additionally includes supplying a picture video signal to the cathode ray tube model and to the cathode ray tube; determining an operational beam current from the picture video signal using the cathode ray tube model; measuring an operational beam current of the cathode ray tube, which is proportional to the picture video signal; calculating second characteristic quantities from the measured operational beam current and the operational emulated beam current; comparing the second characteristic quantities with the first characteristic quantities stored in the memory; and adjusting the control voltage until the second characteristic quantities substantially match the first characteristic quantities stored in the memory during the calibration phase.

The objects are also achieved by a circuit arrangement for controlling the operating point of a cathode ray tube, to which a video signal is supplied and which includes a control grid that applies a control voltage to the cathode ray tube. Specifically, the circuit arrangement includes a cathode ray tube model (a) that determines an emulated beam current from a test video signal during a calibration phase using a test image for a set operating point with different brightness and contrast values and that (b) determines an operational emulated beam current from a supplied video signal during normal operation; an arithmetic unit that (a) calculates first characteristic quantities during the calibration phase from a measured beam current value and the emulated beam current, which is proportional to the video signal, and that (b) calculates second characteristic quantities during the normal operation from an operating measured beam current and an operating emulated beam current, which is proportional to the video signal; a memory for storing the first characteristic quantities; a comparator for comparing the second characteristic quantities determined during the normal operation with the first characteristic quantities stored in the memory during the calibration operation; and an adjusting unit that adjusts the control voltage until the second characteristic quantities substantially match the first characteristic quantities stored in the memory.

One important idea underlying the invention is to provide a model for controlling the operating point of a cathode ray tube. In other words, the cathode ray tube model emulates the behavior of the actual cathode ray tube. A video signal is supplied to both the model and the cathode ray tube. During a calibration phase, when a monitor is energized, characteristic quantities, e.g., in the form of quotients, are first determined from the real and the emulated beam currents with a previously set operating point using a given test image for various brightness and/or contrast values. These characteristic quantities are stored in a memory of an adjustment unit. Characteristic quantities are also determined from the real and the emulated beam currents during normal operation of the monitor, i.e., when the cathode ray tube is controlled by corresponding picture signals. These characteristic quantities are compared with the characteristic quantities stored in the memory. If the respective characteristic quantities differ from one another, which is mostly attributable to aging effects of the cathode ray tube, the characteristic quantities for each image to be displayed are adapted to the ones stored in the memory by adjusting the control voltage accordingly.

Advantageously, the invention makes it possible to control the operating point of the cathode ray tube while an image is being displayed, i.e., while the cathode ray tube is controlled by a corresponding picture signal. Injection of a test signal, which would disturb a viewer, is not required. In addition, the measurement as the basis for control is carried out without negatively affecting the frequency response of the video amplifier, which has a positive effect on the bandwidth of the monitor.

BRIEF DESCRIPTION OF THE DRAWINGS

The invention will now be described in greater detail with the aid of an embodiment of the invention, by way of example, with reference to the single FIGURE depicted in the drawing. The drawing shows a schematic representation of an arrangement with a cathode ray tube.

DETAILED DESCRIPTION OF THE PREFERRED EMBODIMENTS

A video signal 1 is supplied simultaneously to a cathode ray tube model 2 and to an actual cathode ray tube for the display of an image via injection points A and/or B. Injection point A is arranged in front of a contrast adjuster 4 of a video end stage and injection point B between the contrast adjuster 4 and a downstream brightness adjuster 5 of the video end stage. As a function of video signal 1 and an anode voltage of an anode 15 generated by a high voltage generator 6, a beam current flows inside cathode ray tube 3, which the high voltage generator 6 detects and a first integration unit 7 integrates over one image cycle.

The cathode ray tube model 2 can be implemented in any of a variety of different ways. For instance, according to one embodiment, the cathode ray tube model 2 is an electronic circuit including an appropriately parameterized diode network that simulates an actual cathode ray tube. Alternatively, the model 2 can be embodied as a data processing unit programmed to simulate the actual cathode ray tube, such as a microprocessor with an associated memory.

From the video signal, the cathode ray tube model 2 generates an emulated beam current, which the second integration unit 8 also integrates over one image cycle. The first and second integration units 7, 8 supply the integrated beam currents to an evaluation unit 9, which includes a memory 10, a comparator 11, an operating point adjusting unit 12 and an arithmetic unit 13. The arithmetic unit 13 determines a characteristic quantity, e.g., in the form of a quotient of the measured and the emulated beam currents. The comparator 11 compares these characteristic quantities with the characteristic quantities stored in memory 10 of the adjusting unit 12.

As described above, the stored characteristic quantities are determined beforehand from a beam current measured and emulated in a calibration phase with the test image for an adjusted operating point with various brightness and/or contrast values. If the characteristic quantities stored in the memory 10 were determined with various brightness values, the video signal 1 must be supplied to the cathode ray tube model 2 via injection point B. If the characteristic quantities stored in memory 10 were determined with every combination of brightness and contrast values, the video signal 1 must be supplied to cathode ray tube model 2 via injection point A.

In order to keep the operating point of the cathode ray tube 3 properly adjusted, the characteristic quantities determined during the display of an image must be kept constant during the entire operating time of the monitor. This means that these characteristic quantities must be adapted to the corresponding characteristic quantities in memory 10. To this end, the operating point adjustment unit 12 adjusts a control voltage in a control grid 14 of the cathode ray tube 3 required for operating point adjustment in such a way that the calculated characteristic quantities substantially match those stored in memory 10. This eliminates external factors, e.g., due to aging of the tube 3, which negatively affect a set operating point of the tube and which influence the contrast and the brightness of the tube.

What is claimed is:

1. Method for controlling the operating point of a cathode ray tube, to which a video signal is supplied and which includes a control grid that applies a control voltage from an adjusting unit for adjusting the operating point, comprising:

a) during a calibration phase using a test image for a set operating point with different brightness and/or contrast values:

supplying a test video signal to a cathode ray tube model and to the cathode ray tube;

determining an emulated beam current from the video signal using the cathode ray tube model, measuring a beam current of the cathode ray tube, which is proportional to the video signal, calculating first characteristic quantities from the measured beam current and the emulated beam current, storing said first characteristic quantities calculated from the measured and emulated beam currents in a memory location, b) during normal operation, when the cathode ray tube is controlled with picture signals:

supplying a picture video signal to the cathode ray tube model and to the cathode ray tube;

determining an operational beam current from the picture video signal using the cathode ray tube model, measuring an operational beam current of the cathode ray tube, which is proportional to the picture video signal, calculating second characteristic quantities from the measured operational beam current and the operational emulated beam current;

comparing the second characteristic quantities with the first characteristic quantities stored in the memory, and adjusting the control voltage until the second characteristic quantities substantially match the first characteristic quantities stored in the memory during the calibration phase, as a function of said comparison.

2. A circuit arrangement for controlling the operating point of a cathode ray tube, to which a video signal is supplied and which includes a control grid that applies a control voltage to the cathode ray tube, said circuit arrangement comprising:

a cathode ray tube model that (a) determines an emulated beam current from a test video signal during a calibration phase using a test image for a set operating point with different brightness and contrast values and that (b) determines an operational emulated beam current from a supplied video signal during normal operation;

an arithmetic unit that (a) calculates first characteristic quantities during the calibration phase from a measured beam current value and the emulated beam current, which is proportional to the video signal, and that (b) calculates second characteristic quantities during the normal operation from an operating measured beam current and an operating emulated beam current, which is proportional to the video signal;

a memory for storing the first characteristic quantities, a comparator for comparing the second characteristic quantities determined during the normal operation with the first characteristic quantities stored in the memory during the calibration operation, and an adjusting unit that adjusts the control voltage until the second characteristic quantities substantially match the first characteristic quantities stored in the memory.

3. A device, comprising:

a cathode ray tube;

a control grid for applying a control voltage to said cathode ray tube;

a high voltage generator for inducing an anode voltage at a point on said cathode ray tube, which causes a beam current to flow inside said cathode ray tube;

a first integrator for integrating the beam current over an image cycle;

a cathode ray tube model for generating an emulated beam current;

a second integrator for integrating the emulated current over the image cycle;

an arithmetic unit for determining first and second characteristic quantities in the form of respective quotients of the measured beam current and emulated beam current, wherein the first characteristic quantities are determined during a calibration phase and the second characteristic quantities are determined during normal operation of said cathode ray tube;

a memory location for storing the first characteristic quantities;

a comparator for comparing the second characteristic quantities with the first characteristic quantities stored in said memory location; and an adjustment unit that adjusts the control voltage in said control grid so that the second characteristic quantities substantially match the first characteristic quantities stored in said memory location.

4. The device according to claim 3, wherein said memory, said comparator, said adjustment unit and said arithmetic unit are components of an evaluation unit that receives the integrated beam current and the integrated emulated current from said first integrator and said second integrator, respectively.

5. The device according to claim 3, further comprising a first injection point for supplying a video image to said cathode ray tube model when the first characteristic quantities stored in said memory are determined using a plurality of brightness values.

6. The device according to claim 3, further comprising a second injection point for supplying a video image to said cathode ray tube model when the first characteristic quantities stored in said memory are determined using a combination of brightness and contrast values.

7. A method for controlling the operating point of a cathode ray tube, comprising:

supplying a video signal to a cathode ray tube;

applying a control voltage to an adjustment unit for adjusting the operating point;

inducing an anode voltage at a point on the cathode ray tube using a high voltage generator, which causes a beam current to flow inside the cathode ray tube;

integrating the beam current over an image cycle to produce a measured beam current;

generating an emulated beam current using a cathode ray tube model;

integrating the emulated beam current over one image cycle;

calculating first and second characteristic quantities as respective quotients of the integrated measured beam current and the integrated emulated beam current values, wherein the first characteristic quantities are determined during a calibration phase and the second characteristic quantities are determined during normal operation;

storing the first characteristic quantities in a memory location;

comparing the second characteristic quantities with the first characteristic quantities stored in the memory location; and adjusting the control voltage so that the second characteristic quantities substantially match the first characteristic quantities stored in the memory location.

8. The method according to claim 7, further comprising supplying a video image to the cathode ray tube model when the first characteristic quantities stored in the memory location are determined using a plurality of brightness values.

9. The method according to claim 7, further comprising supplying a contrast-adjusted video image to the cathode ray tube and the cathode ray tube model when the first characteristic quantities stored in the memory location are determined with a combination of brightness and contrast values.

* * * * *